(12) United States Patent
Osawa

(10) Patent No.: US 8,248,534 B2
(45) Date of Patent: Aug. 21, 2012

(54) IMAGE PROCESSING APPARATUS AND CONTROL METHOD THEREFOR

(75) Inventor: Seiji Osawa, Aiko-gun (JP)

(73) Assignee: Canon Kabushiki Kaisha, Tokyo (JP)

( * ) Notice: Subject to any disclaimer, the term of this patent is extended or adjusted under 35 U.S.C. 154(b) by 413 days.

(21) Appl. No.: 12/512,447

(22) Filed: Jul. 30, 2009

(65) Prior Publication Data

US 2010/0026894 A1 Feb. 4, 2010

(30) Foreign Application Priority Data

Aug. 4, 2008 (JP) .................................. 2008-200588

(51) Int. Cl.
*H04N 9/74* (2006.01)
*H04N 5/445* (2006.01)

(52) U.S. Cl. ........................................ 348/588; 348/564
(58) Field of Classification Search .................. 348/554, 348/558, 564–569, 588, 584, 598; *H04N 5/445, H04N 5/45, 5/50, 9/74, 5/46, 9/76*
See application file for complete search history.

(56) References Cited

U.S. PATENT DOCUMENTS 5,867,227 A * 2/1999 Yamaguchi ................... 348/565
2006/0290817 A1 * 12/2006 Yui et al. ....................... 348/564

FOREIGN PATENT DOCUMENTS

JP 11-136595 5/1999

* cited by examiner

*Primary Examiner* — Sherrie Hsia
(74) *Attorney, Agent, or Firm* — Cowan, Liebowitz & Latman, P.C.

(57) ABSTRACT

An image processing apparatus having multi-window display mode for displaying a plurality of images and single-window display mode for displaying one image on the display screen, including receiving units which receive broadcast signal and acquiring image signals relating to programs, and acquisition unit which acquires program information of the programs, and memory unit which stores program information of a selected program, and control unit which selects display mode for an image, and the control unit exerts control such that if the multi-window display mode is selected, a comparison is made at predetermined timing between the program information about the selected program and program information about newly selected program, and the display mode is switched from multi-window mode to single-window mode according to the comparison result.

18 Claims, 17 Drawing Sheets

| IDENTIFICATION NUMBER | Ch NUMBER | PROGRAM NAME |
|---|---|---|
| 1 | 2 | SOCCER TELECAST PROGRAM |
| 2 | 5 | BASEBALL TELECAST PROGRAM |
| 0 | NA | NA |
| 0 | NA | NA |

FIG. 2

| IDENTIFICATION NUMBER | Ch NUMBER | PROGRAM NAME |
|---|---|---|
| 1 | 2 | SOCCER TELECAST PROGRAM |
| 0 | 5 | NA |
| 0 | NA | NA |
| 0 | NA | NA |

FIG. 3

| IDENTIFICATION NUMBER | UPPER POSITION | LEFT POSITION | SIZE | Ch NUMBER | PROGRAM NAME |
|---|---|---|---|---|---|
| 1 | 160 | 0 | 70% | 2 | SOCCER TELECAST PROGRAM |
| 2 | 590 | 1350 | 30% | 5 | BASEBALL TELECAST PROGRAM |
| 0 | NA | NA | NA | NA | NA |
| 0 | NA | NA | NA | NA | NA |
| MAIN WINDOW | 1 | | | | |

| IDENTIFICATION NUMBER | UPPER POSITION | LEFT POSITION | SIZE | Ch NUMBER | PROGRAM NAME |
|---|---|---|---|---|---|
| 1 | 160 | 0 | 70% | 2 | SOCCER TELECAST PROGRAM |
| 2 | 590 | 1350 | 30% | 5 | BASEBALL TELECAST PROGRAM |
| 0 | NA | NA | NA | NA | NA |
| 0 | NA | NA | NA | NA | NA |

| MAIN WINDOW |
|---|
| 1 |

FIG. 12B

| IDENTIFICATION NUMBER | UPPER POSITION | LEFT POSITION | SIZE | Ch NUMBER | PROGRAM NAME |
|---|---|---|---|---|---|
| 0 | 160 | 0 | 70% | 2 | NA |
| 2 | 0 | 0 | 100% | 5 | BASEBALL TELECAST PROGRAM |
| 0 | NA | NA | NA | NA | NA |
| 0 | NA | NA | NA | NA | NA |

| MAIN WINDOW |
|---|
| 2 |

FIG. 15A

| IDENTIFICATION NUMBER | UPPER POSITION | LEFT POSITION | SIZE | Ch NUMBER | GENRE |
|---|---|---|---|---|---|
| 1 | 160 | 0 | 70% | 2 | SPORTS : SOCCER |
| 2 | 590 | 1350 | 30% | 5 | SPORTS : BASEBALL |
| 0 | NA | NA | NA | NA | NA |
| 0 | NA | NA | NA | NA | NA |
| MAIN WINDOW | 1 | | | | |

FIG. 15B

| IDENTIFICATION NUMBER | UPPER POSITION | LEFT POSITION | SIZE | Ch NUMBER | GENRE |
|---|---|---|---|---|---|
| 1 | 160 | 0 | 70% | 8 | SPORTS : SOCCER |
| 2 | 590 | 1350 | 30% | 5 | SPORTS : BASEBALL |
| 0 | NA | NA | NA | NA | NA |
| 0 | NA | NA | NA | NA | NA |
| MAIN WINDOW | 1 | | | | |

IMAGE PROCESSING APPARATUS AND CONTROL METHOD THEREFOR

BACKGROUND OF THE INVENTION

1. Field of the Invention

The present invention relates to an image processing apparatus that selects, synthesizes, and outputs image signals received by a plurality of receiving units, and relates to a control method therefor.

2. Description of the Related Art

Broadcast digitalization has enabled multi-channel broadcasting. The way of watching a multi-channel broadcast including arranging a plurality of windows on a single display screen and assigning images on different channels to their corresponding windows is becoming popular. For example, as shown in FIG. 16A, two display areas are arranged on the display screen 201 of a television, one of which is assigned as a main-window 202 and the other as a sub-window 203, and two images are displayed in the corresponding windows. Soccer telecast program and baseball telecast program are displayed in the main-window 202 and sub-window 203 respectively, making it possible to check the baseball game any time while watching the soccer game. Actually, a television capable of displaying a plurality of windows on a display screen has achieved the practical use.

Conventionally, where a power source is turned off when a television is watched in a multi-window, and turned on thereafter, an image displayed in the main-window 202 previously is again displayed on the entire display screen 201 (see, FIG. 16B).

A technique has been proposed in which pieces of information corresponding to a plurality of windows displayed on a display screen are stored and images are displayed in many windows based on these pieces of information. In Japanese Patent Application Laid-Open (JP-A) No. 11-136595, a main-window is displayed over the display screen of a television and a plurality of sub-windows is arranged on parts of the main-window. The device disclosed in JP-A No. 11-136595 has a means for displaying images in the main-window and sub-windows and a means for storing the position and size of each window and identification information for each program, thereby enabling reproduction in the plurality of windows on the display screen, based on each of the pieces of the stored information.

SUMMARY OF THE INVENTION

However, the foregoing conventional technique has the problems described below.

In the conventional example as shown in FIG. 16A, when a power source is turned on, an image previously displayed in the main window 202 is displayed on the entire display screen 201. Therefore, where the power source is turned off due to erroneous operation during a user's watching television in a multi-window, an image is displayed in the single main-window, as shown in FIG. 16B, even when the power source has just been turned on. Accordingly, the user has to set the screen configuration again if he or she wants to watch television in the multi-window format continuously. In addition, for example, suppose that the power source is turned off in order to temporarily stop watching a soccer telecast program while sometimes checking a baseball remote broadcast, and the power source is turned on again after a long time has passed. In this case, the soccer telecast program shown in the main window immediately prior to the power source's being turned off is displayed in the single window, as shown in FIG. 16B even if the baseball telecast program and the soccer telecast program have been continued. Accordingly, when the user wants to watch television in the same screen configuration as before the power source was turned off, the user has to set the screen configuration again. This is troublesome to the user.

In the apparatus disclosed in JP-A No. 11-136595, a multi-window is continuously displayed based on stored information. Therefore, a screen configuration identical to that just before the power source was turned off is reproduced when the power source is turned on.

However, suppose that a user turns off the power source when watching a soccer telecast program while sometimes checking a baseball remote broadcast (see FIG. 17A), and when the user turns on the power source again, the baseball telecast program is over and another program is being broadcast. In this case, the apparatus disclosed in JP-A No. 11-136595 displays images in two windows, the main window 202 and sub-window 208, as in the state before the power source was turned off (see FIG. 17B). As described above, where it is no longer necessary to check the baseball game in the multi-window and a user wants to display only the main window on the display screen, he or she has to operate the television in order to change from a multi-window display to a single-window display. This also is troublesome to the user.

Such a situation may occur not only when the power source is turned on but also when the baseball telecast program is over and another program starts while a user is watching soccer and baseball telecast programs in a multi-window. In this case, it becomes unnecessary to watch television in a multi-window. However, in the case of the conventional apparatus, the screen configuration has to be set anew in order to display images in a multi-window continuously. This increases the burden on a user.

It is accordingly an object of the present invention to provide a technique for increasing convenience to a user by switching between the multi-window and single-window display modes of an image processing apparatus and selecting an image signal to be output automatically.

There is provided an image processing apparatus according to the present invention, having a multi-window display mode for displaying a plurality of images and a single-window display mode for displaying one image on a display screen of a display unit, and a plurality of receiving units which receive broadcast signal and acquire image signals relating to a plurality of programs, and an acquisition unit which acquires program information relating to the plurality of programs, and a memory unit which stores the program information relating to at least one selected program, and a control unit which selects a display mode for an image based on the image signal, wherein the control unit compares the program information relating to the selected program stored in the memory unit with program information relating to a newly selected program acquired by the acquisition unit at a predetermined timing if the multi-window display mode is selected, and switches the display mode from the multi-window display mode to the single-window display mode according to the result of comparing.

There is a method for controlling an image processing apparatus according to the present invention, having a multi-window display mode for displaying a plurality of images and a single-window display mode for displaying one image on a display screen of a display unit, and a step of receiving broadcast signal and acquiring image signals relating to a plurality of programs, and a step of acquiring program information relating to the plurality of programs, and a step of storing program information relating to at least one selected program or programs, and a control step of selecting a display mode for an image based on the image signal, wherein the control step compares the program information relating to the selected program stored in the step of storing with program information relating to a newly selected program acquired in the step of acquiring at a predetermined timing if the multi-window display mode is selected, and switches the display mode from the multi-window display mode to the single-window display mode according to the result of comparing.

According to the present invention, an image processing apparatus having multi-window and single-window display modes increases convenience to a user by switching between these display modes and selecting an image signal to be output automatically.

Further features of the present invention will become apparent from the following description of exemplary embodiments with reference to the attached drawings.

BRIEF DESCRIPTION OF THE DRAWINGS

FIG. 2 is an example of information stored in a memory unit 7 according to the first embodiment;

FIG. 3 is an example of changed information stored in the memory unit 7 according to the first embodiment;

FIG. 8 is an example of changed information stored in the memory unit 7 according to a second embodiment;

FIGS. 12A and 12B are examples of information stored in the memory unit 7 according to the third embodiment;

FIGS. 15A and 15B are examples of information stored in the memory unit 7 according to the fourth embodiment;

DESCRIPTION OF THE EMBODIMENTS

In the image processing apparatus according to the present embodiment of the present invention, current and past program information are compared for selected images, and the display is automatically controlled based on the comparison. Controlling a display includes, for example, switching between a multi-window display mode and a single-window display mode and selecting an image signal (i.e., channel) to be displayed. The multi-window display mode is a display mode for outputting a signal so as to simultaneously display two or more image signals on a single display screen. The single-window display mode is a display mode for outputting a signal so as to display only one image signal on a single display screen. Program information is information representing the content of a program, such as the program information contained in a broadcast signal, which includes the name (i.e., title) and genre of the program.

Referring to the accompanying drawings, embodiments according to the present invention will be described in detail below.

First Embodiment

Figure 1:
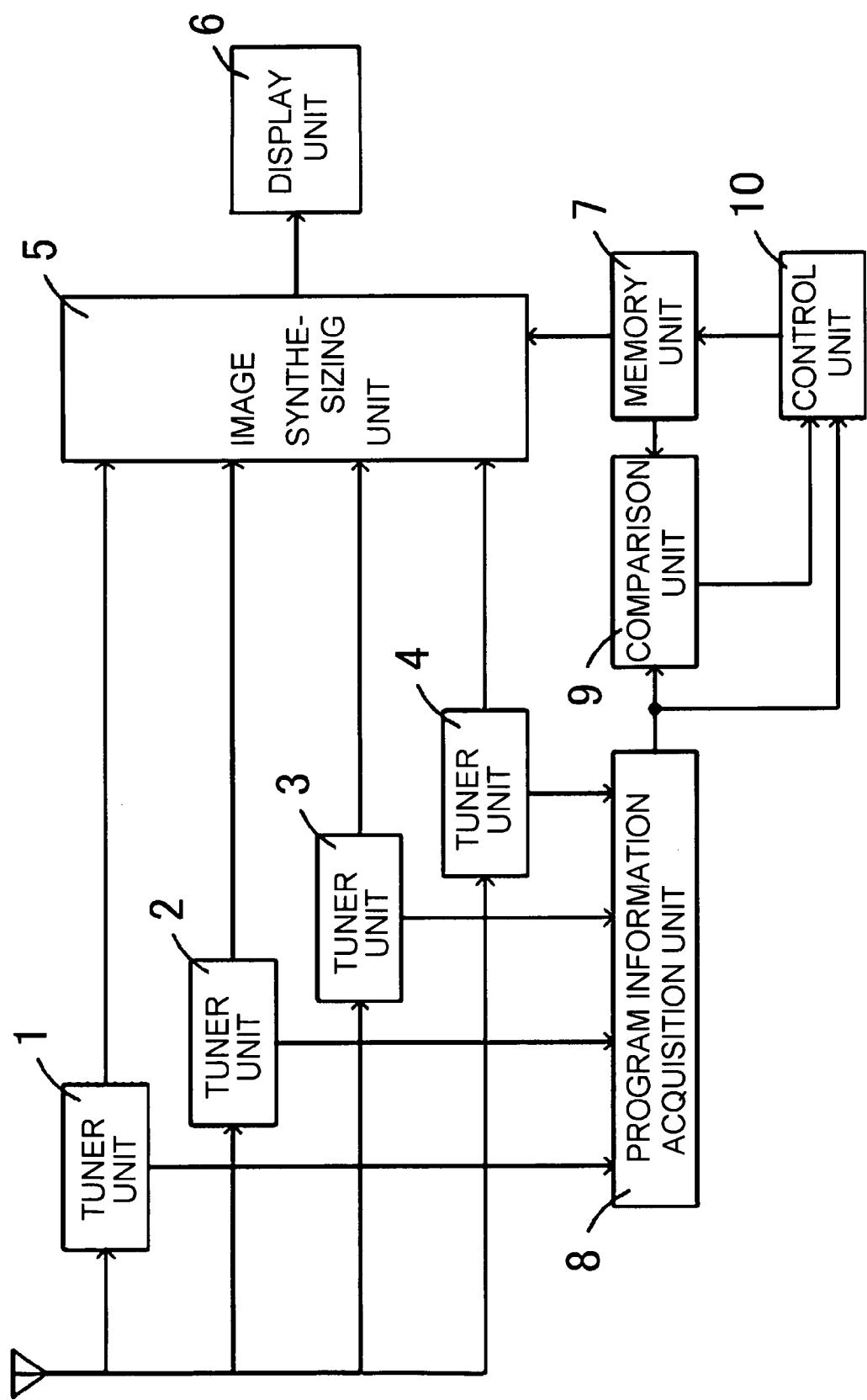
FIG. 1 is a block diagram showing the configuration of an image processing apparatus according to a first embodiment.

FIG. 1 shows a block diagram of the configuration of an image processing apparatus according to the first embodiment of the present invention. The image processing apparatus is an apparatus for generating image signals that are output to a display unit 6. This processing apparatus includes an antenna, a plurality of tuner units 1 to 4 (corresponding to receiving units), an image synthesizing unit 5, a memory unit 7, a program information acquisition unit 8, a comparison unit 9, and a control unit 10. The tuner units 1 to 4 receive digital broadcast waves transmitted via the antenna. The tuner units 1 to 4 select requested channels from the received broadcast waves, and perform demultiplexing, decoding, etc., thereby extracting image and sound signals and program information. From the plurality of image signals extracted by the tuner units 1 to 4, the image synthesizing unit 5 selects, synthesizes, and outputs image signals to be displayed. The display unit 6 displays on a display screen the synthesized image signals output from the image synthesizing unit 5.

FIG. 7A shows an example of an image output to the display unit 6 as a result of synthesizing the image signals by use of the image synthesizing unit 5. Referring to FIG. 7A, arranged on a display screen 101, which is the entire screen of the display unit 6, are display areas 102 and 103, in which independent images are shown. In an example shown in FIG. 7A, remote broadcast soccer and baseball games are shown in the display areas 102 and 103 respectively. In the present embodiment, the display areas in which images are shown are identical in size. In the example in FIG. 7A, the length of vertical and horizontal side of each of the display areas 102 and 103 are 50% of those of the display screen 101.

Referring back to FIG. 1, the memory unit 7 stores information for each display area (hereinafter referred to as "display area information") on the display screen when image signals are synthesized by the image synthesizing unit 5. As the memory unit 7, it is preferable to use a nonvolatile storage medium which is capable of storing contents even after the power source of the image processing apparatus is turned off, but a volatile storage medium can also be used. A program information acquisition unit 8 acquires program name information from the program information extracted by the tuner units 1 to 4, and outputs it to the memory unit 7 and comparison unit 9 as acquired program name information. In the present embodiment, the program information acquisition unit 8 corresponds to an acquisition unit of the present invention, and the comparison unit 9 is included in the control unit of the present invention.

FIG. 2 shows a detailed example of information stored in the memory unit 7. In the memory unit 7, program information, for example, a program name is stored for each image signal that composing a signal for a multi-window display mode. Information listed in FIG. 2 corresponds to the example of the image shown in FIG. 7A. In FIG. 2, identification numbers are numbers used to distinguish the tuners from one another. The tuner units 1, 2, 3, and 4 are labeled "1," "2," "3," and "4" respectively. The identification number "0"

indicates that no tuner has been selected. A channel number (Ch number) selected by each tuner and "the program information name" of the channel are stored so as to correspond to each of these identification numbers. This display area information is rewritten when the multi-window display is turned on or off, or a program/channel/the number of image screens are altered, and the display area information is held even after the power source is turned off.

In the example in FIG. 2, the image synthesizing unit 5 selects and synthesizes the outputs of the tuner units 1 and 2 under the identification numbers 1 and 2 respectively. However, since the identification numbers 3 and 4 are not stored, the outputs from the tuner units 3 and 4 are not used in synthesizing the foregoing outputs.

Referring back to FIG. 1, the comparison unit 9 compares program name information stored in the memory unit 7 and corresponding current acquired program name information output from the program information acquisition unit 8, and outputs the result of the comparison to the control unit 10. If there is any image whose program name information does not match as a result of the comparison made by the comparison unit 9, the control unit 10 changes display area information so that a single window is displayed on the display screen.

FIG. 3 shows an example of the display area information altered so as to display an image signal in a single window on the display screen. Specifically, in the altered display area information shown in FIG. 3, the identification number "2" has been altered to "0," and "baseball telecast program," which is program name information, has been altered to "NA (Not Available)." As a result, the only identification number remaining other than "0" is only "1." Accordingly, an image from the tuner unit 1 corresponding to the identification number 1 is displayed in a single window over the entire single display screen.

Incidentally, of the information corresponding to the identification number "2," information (i.e., a channel number in the example shown in FIG. 3) other than a program name may be stored and used as the initial information when a multi-window display is requested again.

The operating procedure of the image processing apparatus of the foregoing configuration will now be explained below with reference to flowcharts shown in FIGS. 4 to 6.

Figure 4:
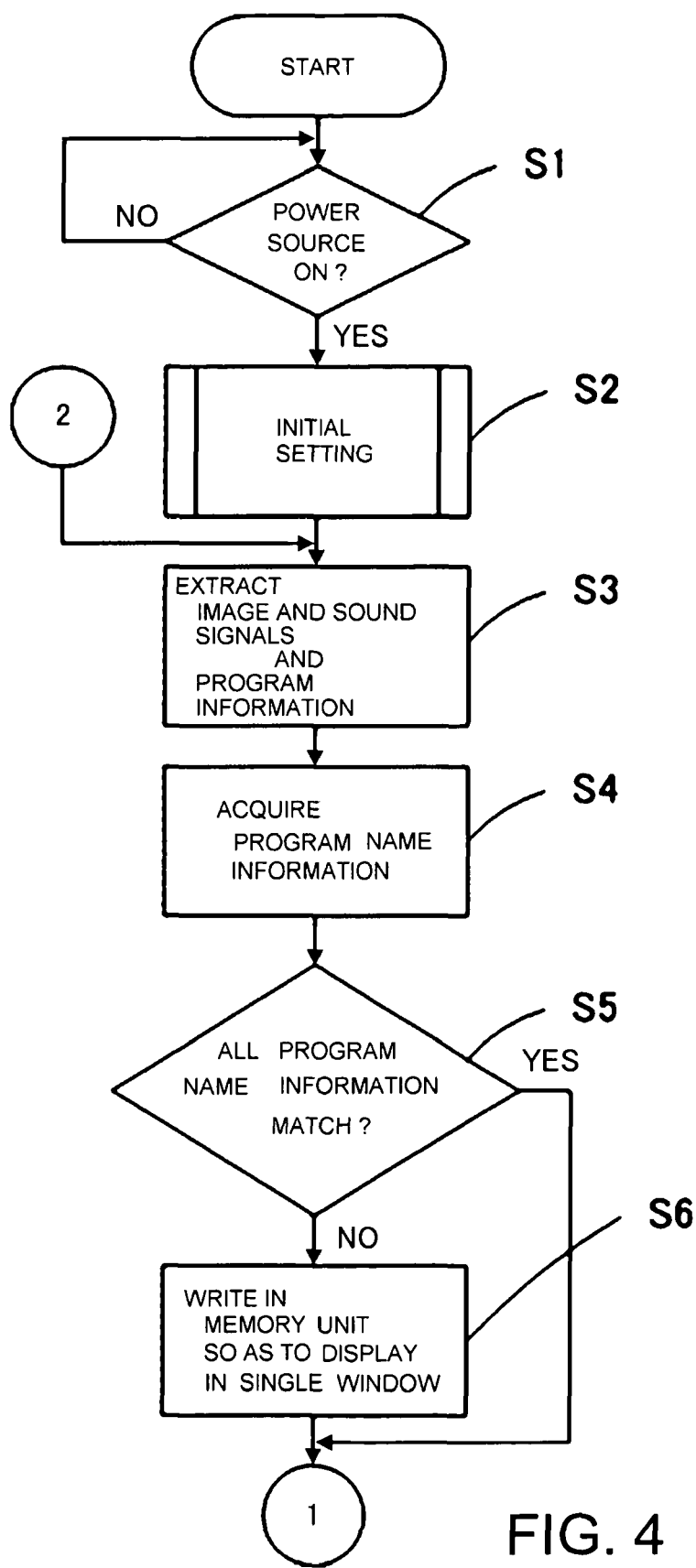
FIG. 4 is a flowchart illustrating a part of the operation according to the first embodiment.
Figure 5:
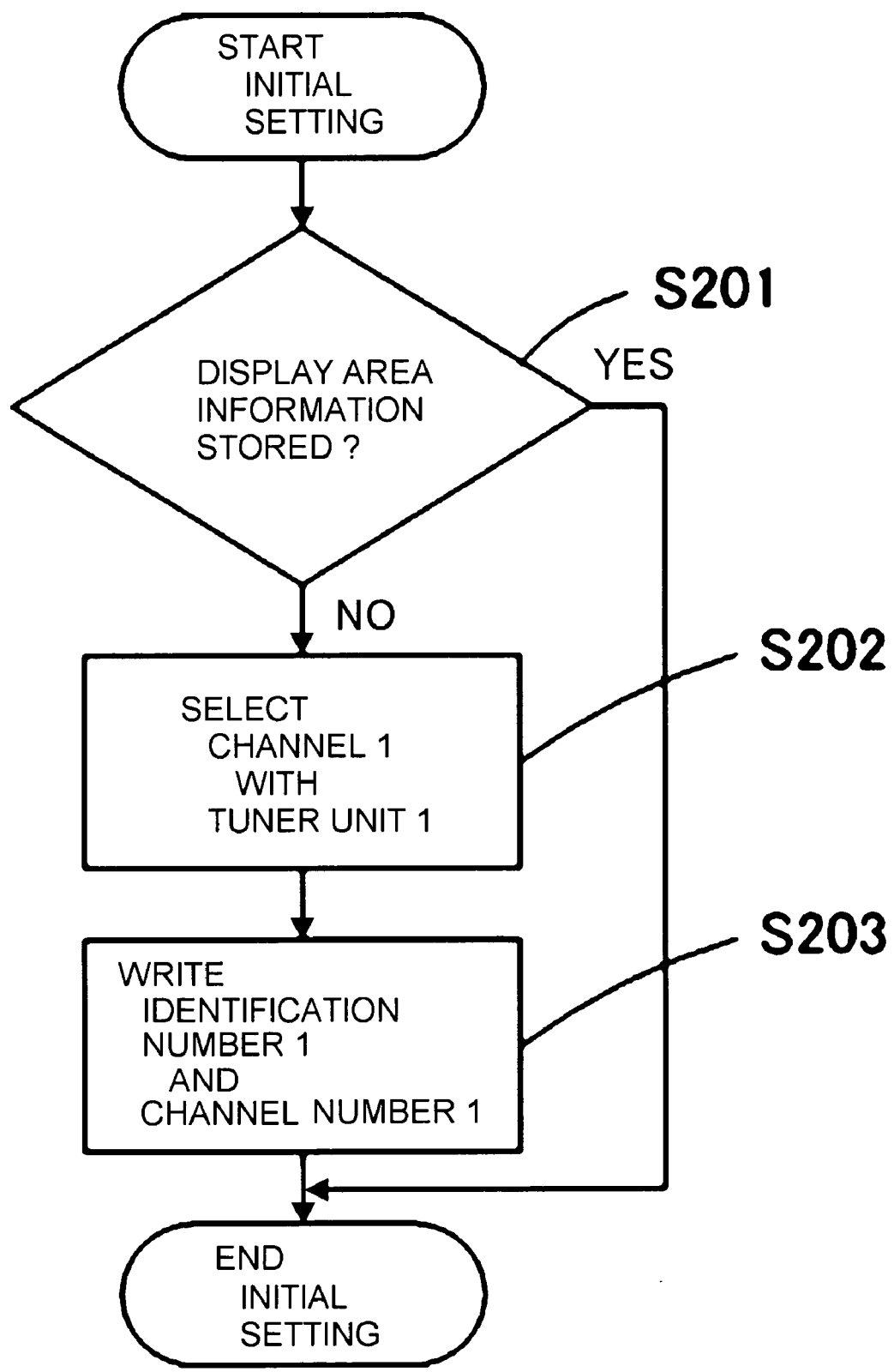
FIG. 5 is a flowchart illustrating the operation of initial setting according to the first embodiment.

In FIG. 4, the apparatus remains in a stand-by state until the power source is turned on (step S1). When the power source is turned on, the initial setting is performed (step S2). The performance of the initial setting will now be described with reference to a flowchart shown in FIG. 5. Upon the start of the initial setting, the control unit 10 first checks the stored contents of the memory unit 7 (step S201). If display area information is stored in the memory unit 7, the initial setting is terminated. Conversely, if display area information is not stored, channel 1 is selected by the tuner unit 1 (step S202). Subsequently, the control unit 10 writes in the memory unit 7 the identification number 1 and the channel number 1 selected by the tuner unit 1 (step S203), terminates the initial setting, and returns to the flowchart shown in FIG. 4.

After the initial setting is terminated, the tuner units 1 to 4 extract their respective image and sound signals and program information from the broadcast waves received by the antenna (step S3).

Subsequently, from program information extracted from each tuner unit, the program acquisition unit 8 acquires the program name information being broadcast (step S4). Then, the comparison unit 9 compares the program name information of the display area information and the program name information acquired in step S4 (hereinafter referred to as "acquired program name information"), and determines whether all corresponding program name information for each display area matches or not (step S5).

Figure 6:
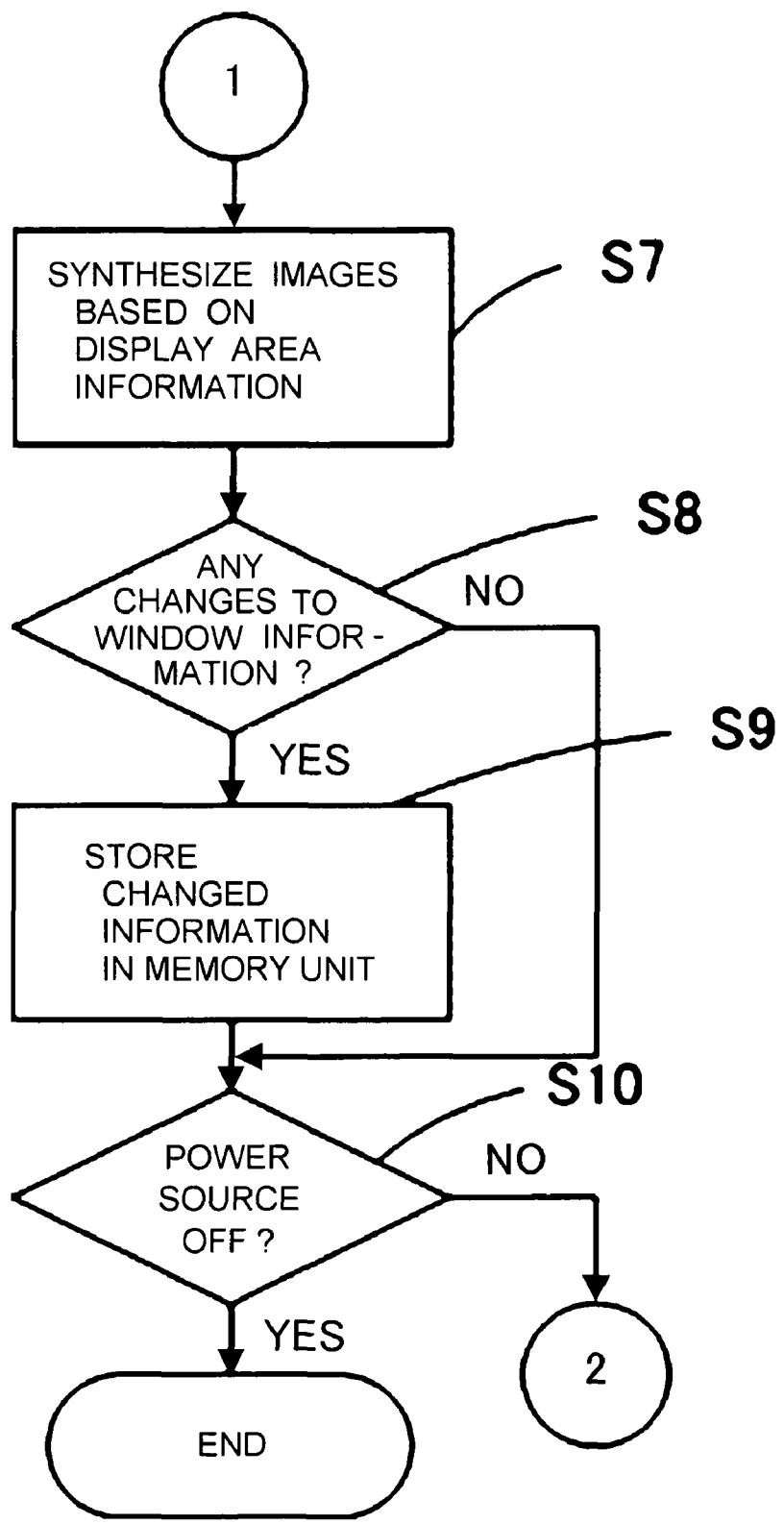
FIG. 6 is a flowchart illustrating a part of the operation according to the first embodiment.

If the determination is made that there is any program whose program name information does not match, the control unit 10 alters the display area information so that an image appears in a single window on the display screen (step S6), and proceeds to the process shown in FIG. 6. If all the program name information for each program matches as a result of the comparison in step S5, the display area information will not be changed.

Then, as shown in FIG. 6, the image synthesizing unit 5 synthesizes input image signals, and outputs it, based on the display area information stored in the memory unit 7 (step S7).

Next, the control unit 10 checks whether there have been any changes to information concerning the image screen such as: whether a user has turned the multi-window display on or off or changed channel or the number of windows; or whether a new program has started with no channel changes (step S8). If there has been any change, the control unit 10 stores the changed information for each display area (step S9). If the information has not changed, there is no change to the display area information either.

Subsequently, a determination is made whether an instruction to turn off the power source has been given or not (step S10). If such an instruction has not been given, the apparatus returns to step S3 and continues the process. If such an instruction has been given, the apparatus turns off the main power source and enters a stand-by state.

In the present embodiment as described above, by virtue of the co-operation of the control unit 10 and the image synthesizing unit 5, switching between display modes and selection of an image signal to be output can be controlled. That is, in the present embodiment, a combination of the control unit 10 and the image synthesizing unit 5 corresponds to the control unit of the present invention.

Figure 7:
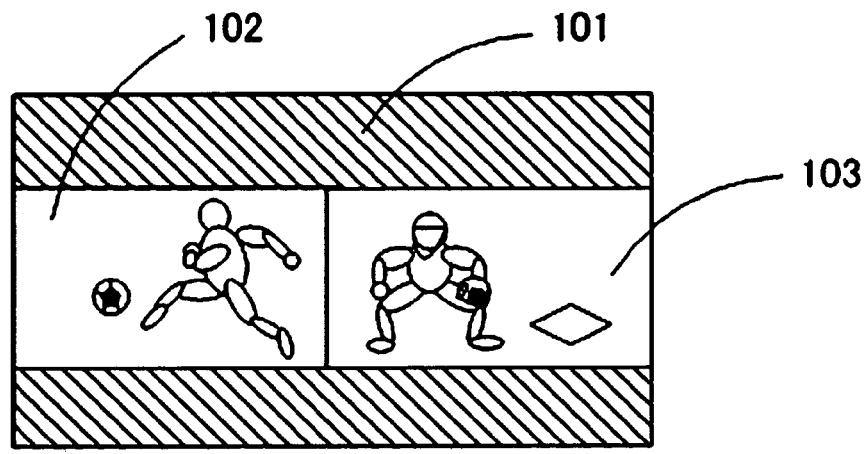
FIGS. 7A to 7C are modified examples of a window according to the first embodiment.
Figure 7:
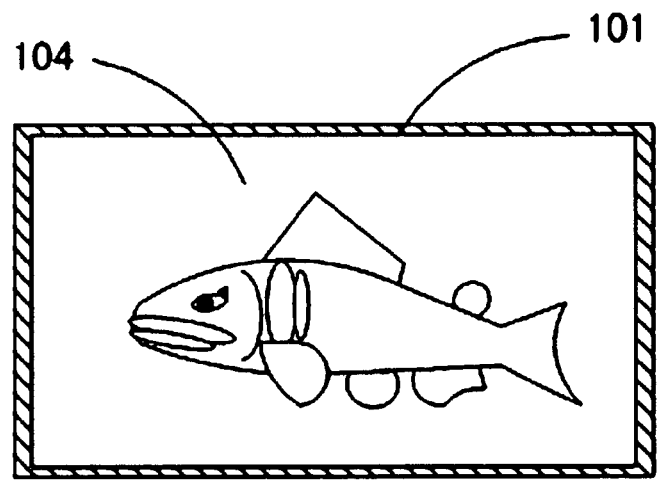
Figure 7:
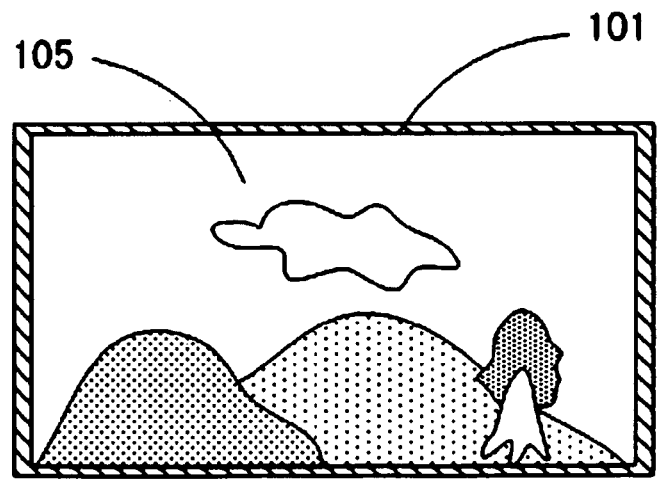

A change to the image screen in the image processing apparatus according to the present embodiment will now be described with reference to FIG. 7.

As described above, FIG. 7A shows a state in which two programs being broadcast are displayed in corresponding windows, one for each. When no operation is carried out by a user and the same programs are continuously broadcast, the programs are continuously displayed in the corresponding two windows, as shown in FIG. 7A.

If the channel corresponding to the display area 102 is altered by the user, the program name is changed, and a determination is made that the program names do not match as a result of the comparison in step S5 in FIG. 4. Consequently, display area information is rewritten so as to display a single window. Accordingly, a broadcast image 104 corresponding to the altered channel is displayed on the single window, as shown in FIG. 7B.

In addition, if the soccer telecast program is over and replaced by another program while the baseball telecast program continues, an image 105 broadcast after the soccer telecast program is displayed in the single window on the display screen 101.

When the soccer or baseball telecast program is over or a user changes channel, it is not necessary to watch television in two windows. In such a case, the present embodiment automatically changes the display to a single window. This eliminates the need for a user's instructions to display a program in a single window, thus increasing user-friendliness.

In the present embodiment, a single window is displayed if there is at least one program whose program name information does not match as a result of the comparison made by the comparison unit 9 between program name information from the display area information and the acquired program name information. However, a single window may be displayed only where no program name information matches as the result of a comparison. Additionally, in a display of three or more windows, all program name information for each program does not have to match; but if program name information matches in at least two cases, the areas where the program names match may only be displayed in multi-windows. In other words, if the number of image signals whose respective program name information matches is only one, this image signal is displayed in a single window; and if the number of image signals whose respective program name information matches is two or more, these image signals are displayed in multi-windows.

In the first embodiment, the program information acquired by the program information acquisition unit 8 is program name information, and it may be other program information, for example, genre information, cast information or the like.

In the present embodiment, a description has been given using an example where a broadcast wave received by the antenna is used as the input source of images and program information is acquired to use. However, the input source does not have to be a broadcast wave as long as program information can be acquired.

Second Embodiment

In an image processing apparatus according to a second embodiment of the present invention, a main window specifying unit 11 is added and connected to the memory unit 7, distinct from the configuration of the first embodiment as shown in FIG. 1. Additionally, information detected as to whether the power source is turned on or off is input to the comparison unit 9. In the second embodiment, a comparison between program names is made simultaneously with the turning on of the power source.

Figure 10:
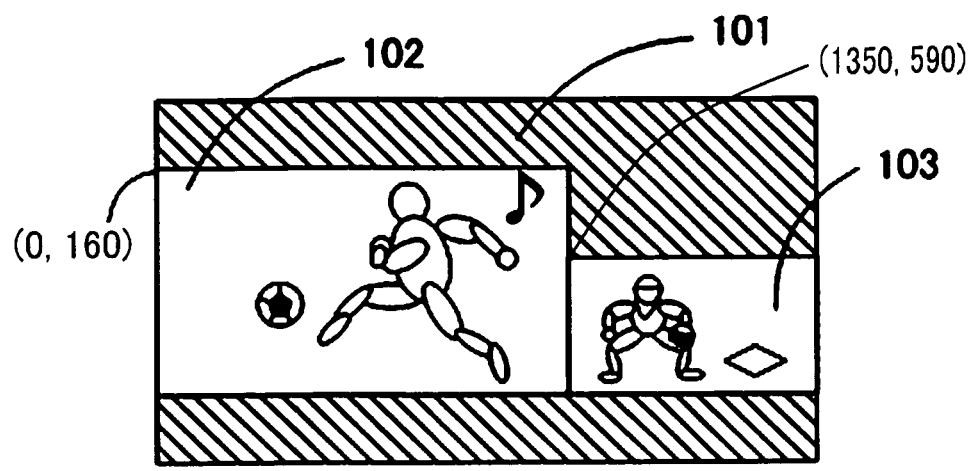
FIGS. 10A to 10C are modified examples of a window according to the second embodiment.
Figure 10:
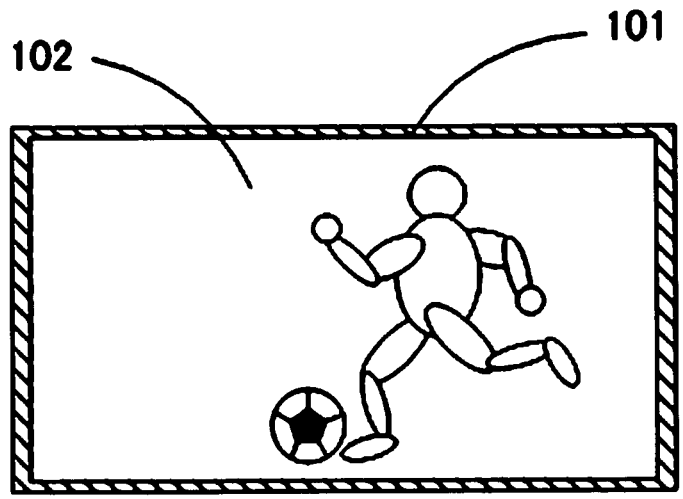
Figure 10:
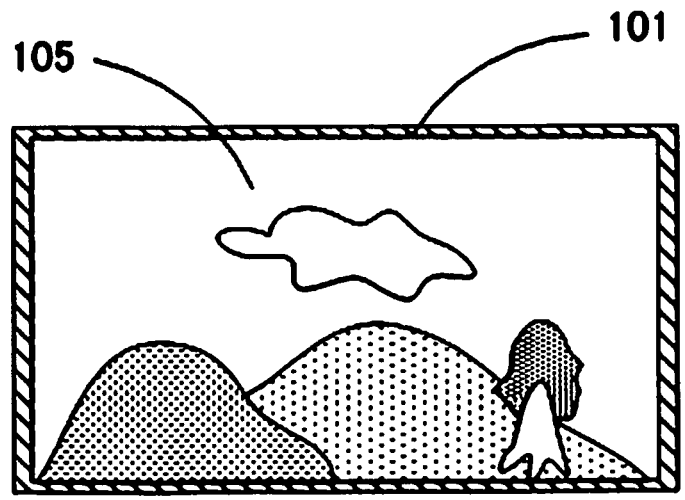

FIG. 10A shows an example of an image input to the display unit 6 in the second embodiment.

In the first embodiment, the sizes of the display areas for the corresponding images shown on the display screen 101 are the same. However, in the second embodiment, the display positions and display sizes of the display areas for corresponding images can be made different form each other. In an example as shown in FIG. 10A, the coordinates of the upper side and left side defining a display area 102 on the display screen are 160 and 0, respectively, while those of the upper and left side defining a display area 103 are 590 and 1350, respectively. In addition, sound accompanying an image displayed in the display area 102 is output from a loudspeaker (not shown). In FIG. 10A, the display area where an image corresponding to the output sound is shown is marked with a musical note.

From display areas corresponding to images synthesized and displayed by the image synthesizing unit 5, the main window specifying unit 11 according to the second embodiment specifies a display area to serve as a main window. The memory unit 7 stores an identification number for specifying an image signal corresponding to the main window. The main window specifying unit 11 specifies as the main window the display area corresponding to the sound being output. FIG. 10A shows an example, the display area 102 is a main window.

FIG. 8 is an example of display area information stored in the memory unit 7. Information listed in FIG. 8 corresponds to an example of the image shown in FIG. 10A. The display area information in FIG. 2 in the first embodiment differs from that in FIG. 8 in the following respect: "the upper position," "the left position," and "the size" of a display area in which an image corresponding to each identification number is displayed are additionally given. An identification number corresponding to the main window is also stored. These pieces of information are rewritten when the size and position of the display area are altered in addition to the case as in the first embodiment.

In the example in FIG. 8, the image synthesizing unit 5 selects outputs from tuner units 1 and 2 with identification numbers 1 and 2 respectively, and synthesizes them according to the position and size information.

To return to the image processing apparatus, in the second embodiment, upon receiving information that turning on of the power source has been detected, the comparison unit 9 compares program name information stored in the memory unit 7 and the current acquired program name information output from the program information acquisition unit 8, and outputs the result to the control unit 10. As a comparison result by the comparison unit 9, if any image whose program name information does not match, the display area information is altered so that a program is displayed in a single window on the display screen.

The operating procedure of the image processing apparatus of the foregoing configuration will now be described below with reference to flowcharts. Incidentally, the procedure from when the power source is turned on to when the comparison unit 9 yields a comparison result is identical to that illustrated in FIG. 4, and the explanation thereof will not be repeated. In step S6 in FIG. 4, display area information is updated so that an image (program) corresponding to the main window is displayed in a single window. If an image (program) corresponding to the main window is over, an image (typically a program on the same channel) being supplied currently to the same input unit as the now finished image (program) is displayed in a single window.

Figure 9:
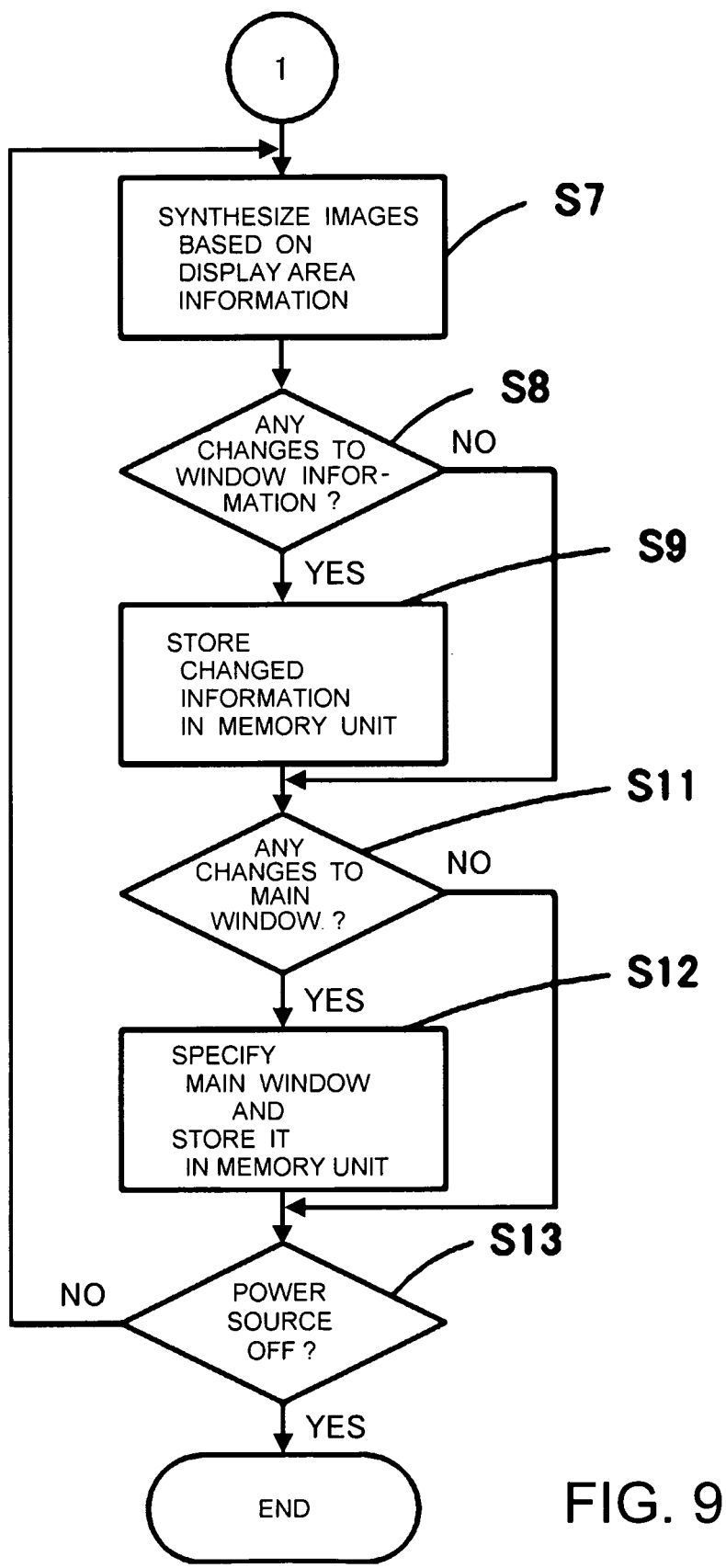
FIG. 9 is a flowchart illustrating a part of the operation according to the second embodiment.

FIG. 9 is a flowchart illustrating an operation that follows step S6. In FIG. 9, the operation from steps S8 to S9 is identical to that in FIG. 6 and only the operation subsequent to the former will now be described.

After the process of alteration to the window information, the apparatus checks whether there is any request, through, for example, a user's operation, to alter the main window (step S11).

If there is an instruction to alter the main window, the main window specifying unit 11 specifies the main window and stores it in the memory unit 7 (step S12). If there is no instruction to alter the main window, the display area information is not altered.

A determination is made whether an instruction to turn off the power source has been given or not (step S13). If this instruction has not been given, the apparatus returns to step S7 and continues the process. If the instruction has been given, the apparatus turns off the main power source and enters a standby state.

Referring to FIGS. 10A to 10C, next will be described changes in the image screen of the image processing apparatus in the second embodiment.

As described above, FIG. 10A shows a state in which two programs being broadcast are displayed in corresponding windows, one for each. For example, suppose that the power source is turned off when the image screen is as shown in FIG. 10A; and then the power source is turned on again after 30 minutes. In this case, if soccer and baseball programs are still being telecasted, the state shown in FIG. 10A is again displayed. Specifically, when the power source is turned on, these programs are displayed in the corresponding two windows, namely the display areas 102 and 103, from the beginning. Thus, when the same contents are continuously broadcast before and after the power source is turned off, these contents can be continuously viewed in the multi-window. This eliminates the need for a user to instruct that the programs be displayed in the multi-window, thus increasing user-friendliness.

If the baseball telecast program has finished but the soccer program is still being telecasted when the power source is turned on, the image showing the soccer telecast program corresponding to the display area 102, specified as the main window, is displayed in one window on the display screen 101, as shown in FIG. 10B.

Additionally, if a baseball game is being remote broadcast but a soccer telecast program has finished when the power source is turned on, an image 105 broadcast after the soccer telecast program is displayed on the display screen 101, as shown in FIG. 10C. When the soccer or baseball telecast program is finished, it becomes unnecessary to watch television in the two windows. In such a case, the present embodiment automatically alters the display to a single window. This eliminates the need for user's instruction to display a program in a single window, thus increasing user-friendliness.

In the second embodiment, if there is at least one difference in program name information found by the comparison unit 9 between the program name information in the display area information and the acquired program name information, a single window, that is, only the main window, is displayed. However, only where no program name information matches, a single window may be displayed. Alternatively, only where some program name information for the main window or sub-window do not match, one window may be displayed.

As a requirement for the main window determined by the main window specifying unit 11, a display area corresponding to sound output is used. However, the main window may be specified by another method. For example, the left upper display area or the largest display area may be specified as the main window.

Third Embodiment

The configuration of the image processing apparatus according to the third embodiment of the present invention differs from the second embodiment in the following respect: the result of the comparison made by the comparison unit 9 is input to the main window specifying unit 11.

In the third embodiment, if, as a result of a comparison between the program name information of the display area information and the acquired program name information made by the comparison unit 9, the program name information for one sub-window matches the acquired program name information even when that for the main window does not match it, the main window specifying unit 11 changes the sub-window to a main window, and displays the image in a single window.

Figure 11:
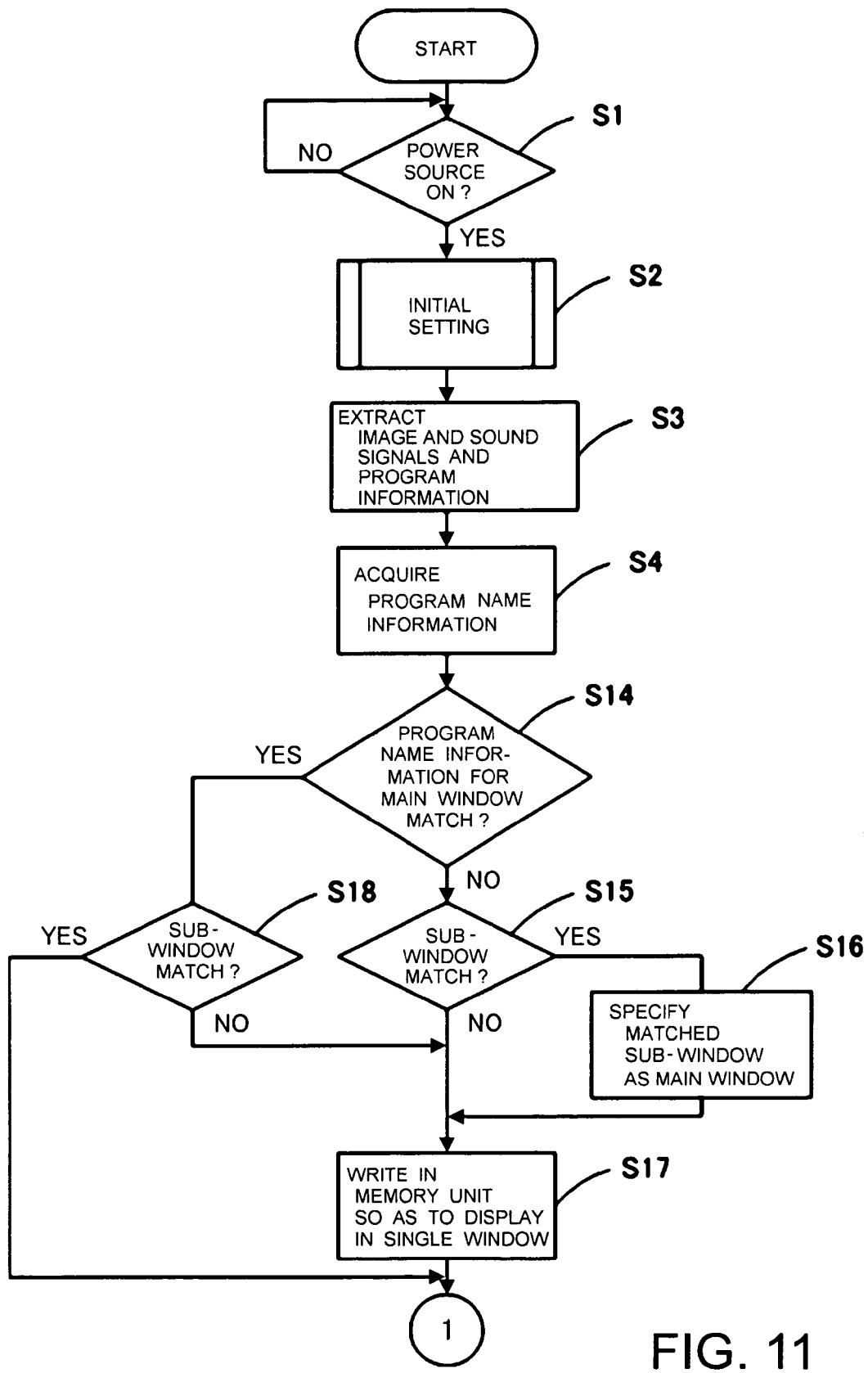
FIG. 11 is a flowchart illustrating a part of the operation according to a third embodiment.

The process underlying the above will now be described with reference to the flowchart in FIG. 11. FIG. 11 shows the process from when the power source is turned on to when display area information is set. The process following synthesis of images based on display area information is identical to that in FIG. 9. Additionally, in FIG. 11, the process up to step S4 in which the program information acquisition unit 8 acquires program name information is identical to that in FIG. 4.

After the program name information for a program being broadcast is acquired, the comparison unit 9 first compares program name information for the main window in the display area information with the corresponding acquired program name information (step S14). If the program name information does not match the acquired program name information, the comparison unit 9 next compares program name information for the sub-window (step S15) with the corresponding acquired program information. If program name information for the sub-window matches, the main window specifying unit 11 specifies this sub-window as the main window, and stores it in the memory unit 7 (step S16). Then, the control unit 10 modifies the display area information so that the image signal in the main window is displayed in a single window (step S17). Also, even where program name information for the sub-window does not match the acquired program name information in step S15, step S17 is executed to display images in a single window.

If the program name information for the main window matches in step S14, the comparison unit 9 also compares the program name information for the sub-window. If the program name information for the sub-window does not match, step S17 is executed. If the program name information for the sub-window matches, information in the memory unit 7 is not changed, and the flow proceeds to the step in the process shown in FIG. 9. Specifically, if neither the program name information for the main window nor the program information for the sub-window change, a multi-window display mode is maintained.

Here, information changes in the memory unit 7 in steps S16 and 17 will now be described with reference to FIGS. 12A and 12B.

FIG. 12A shows display area information stored in the memory unit 7 immediately before the power source is turned off. A channel 2 is being watched in a display area with the identification number 1, and the program is named as a soccer telecast program. In addition, a channel 5 is being watched in a display area with the identification number 2, and the program is named as a baseball telecast program. At this time, the identification number 1 has been assigned to the main window.

FIG. 12B shows an example, when the power source is turned on, the channel 2 has changed to next program and hence program names do not match. In FIG. 12B, the identification number 2 has been assigned to the main window, and the position and size information of the display area bearing the identification number 2 has been rewritten. Additionally, the identification number 1 has been rewritten as 0. Based on this information, the image synthesizing unit 5 synthesizes images. Consequently, the image displayed on the sub-screen when the power source was turned off is now displayed in the single main window.

Figure 13A:
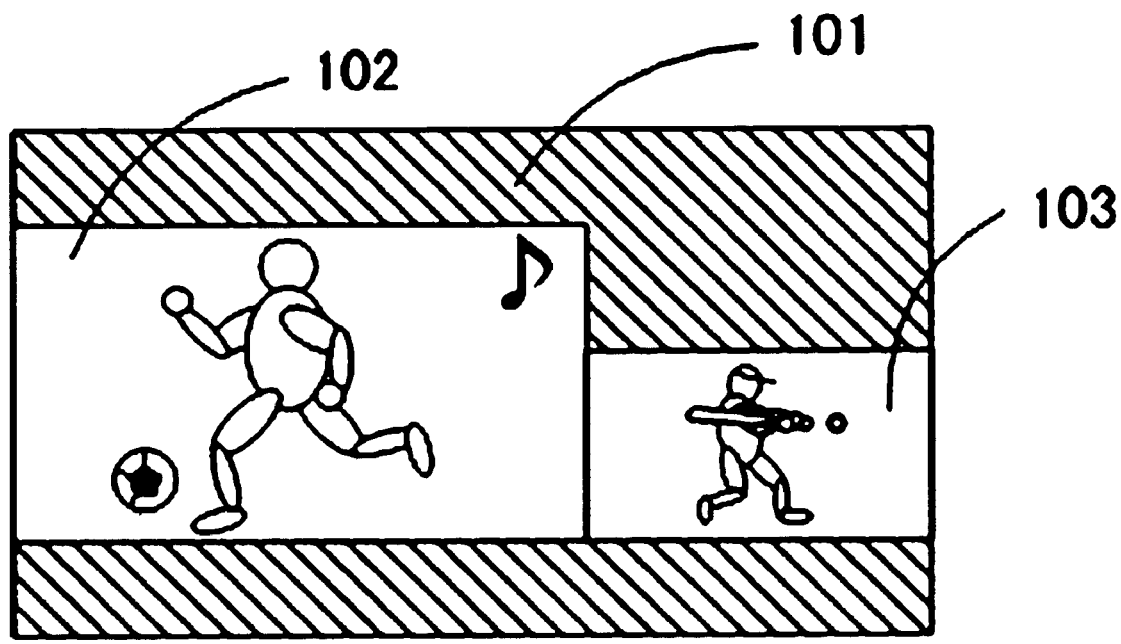
FIGS. 13A and 13B are modified examples of a window according to the third embodiment.
Figure 13B:
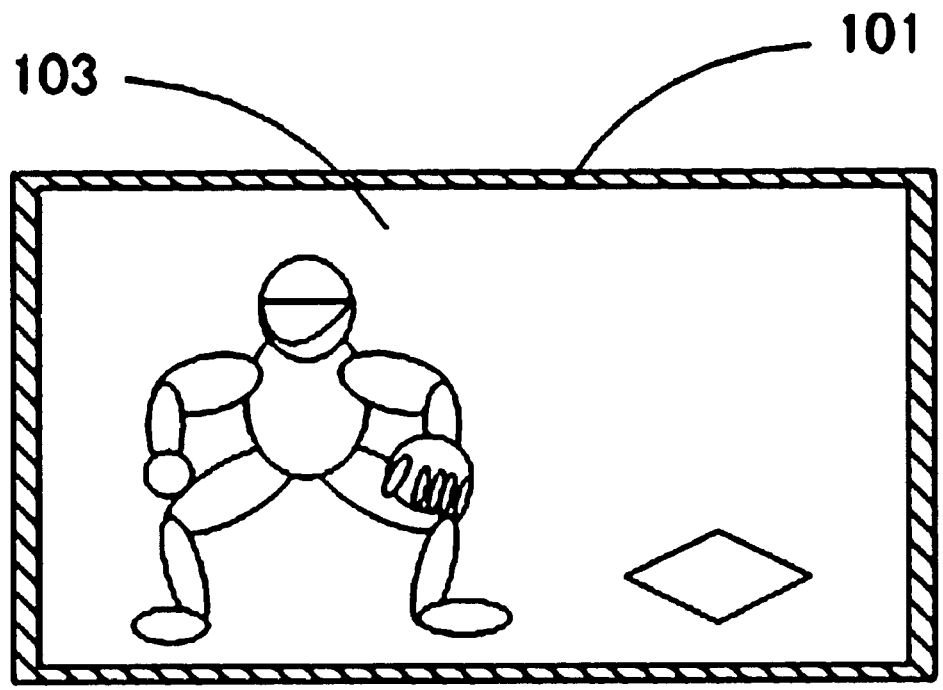

FIGS. 13A and 13B show the display screen at this time. FIG. 13A shows the display screen before the power source is turned off, in which a soccer telecast program and a baseball telecast program corresponding to the main window and the sub-window respectively are shown in the display areas 102 and 103 respectively on the display screen 101. If the soccer game broadcast has finished and the baseball telecast program is still being broadcast after the power source is turned on, the baseball telecast program in the display area 103 is displayed in a single window, as shown in FIG. 13B.

The third embodiment described above yields the following effect: if the program name information for a sub-window matches even where the program name corresponding to the main window when the power source is turned off and that when the power source is turned on differ, the program that was being broadcast when the power source is turned off can still be watched.

Fourth Embodiment

In the configuration of an image processing apparatus according to a fourth embodiment of the present invention, a retrieve unit 12 is added to the configuration of the second embodiment.

A program information acquisition unit 8 according to the present embodiment acquires genre information for a program (also referred to as acquired genre information), and the memory unit 7 stores genre information in lieu of a program name used in the first embodiment. The comparison unit 9 compares the difference of the acquired information between at the time of television being OFF and at the time of television being ON by using the genre information.

Figure 14:
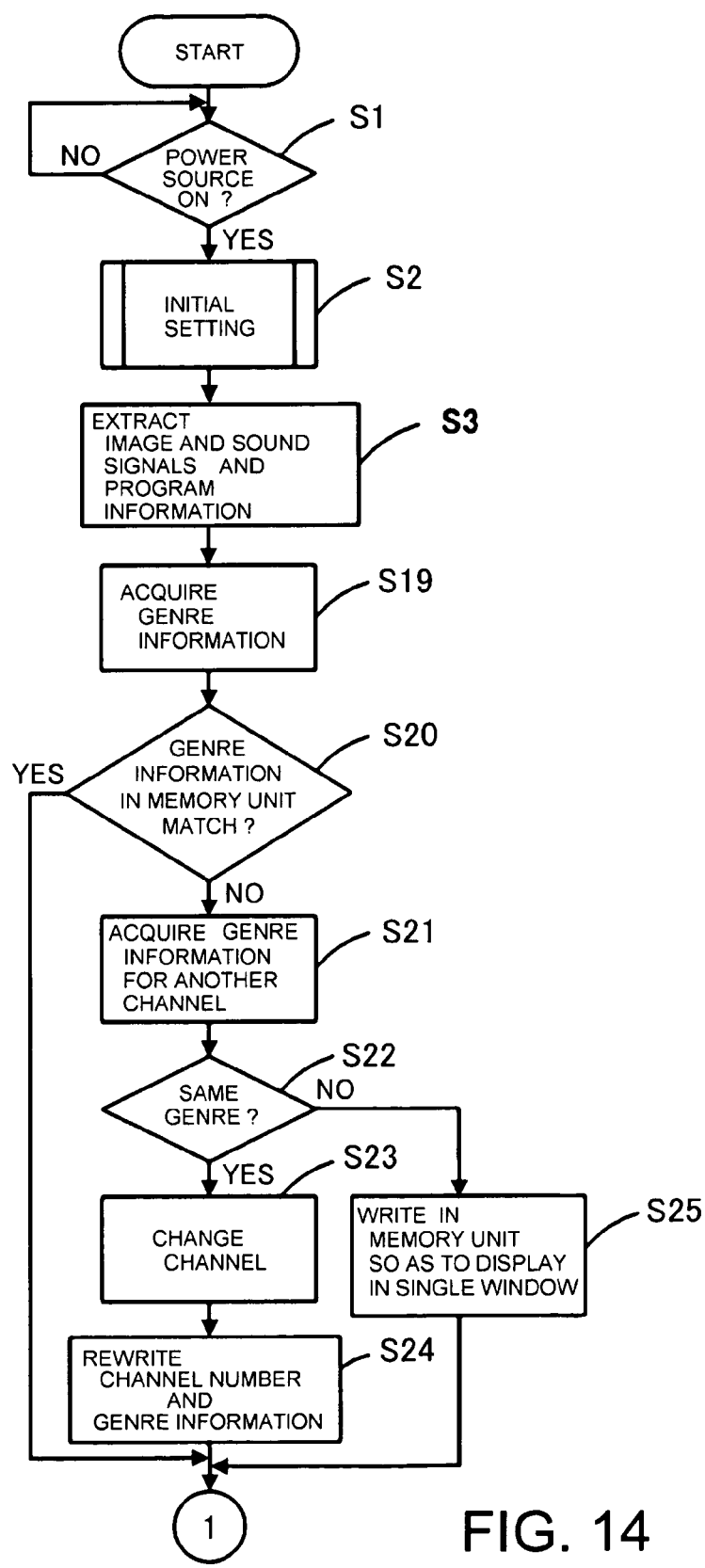
FIG. 14 is a flowchart illustrating a part of the operation according to the first embodiment.
Figure 16A:
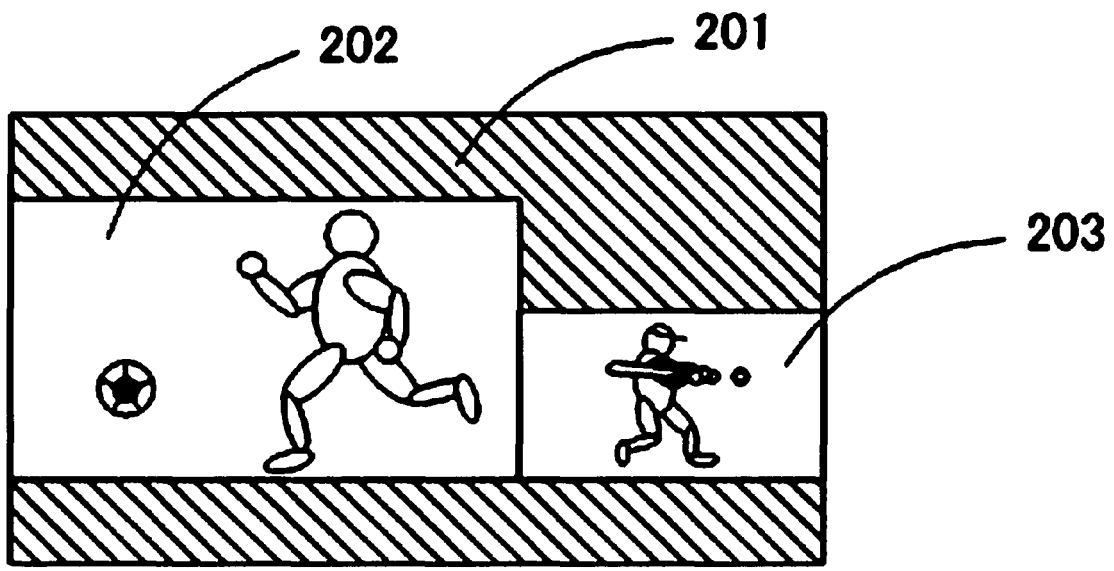
FIGS. 16A and 16B are modified examples of a display screen on a conventional television capable of displaying multi-window.
Figure 16B:
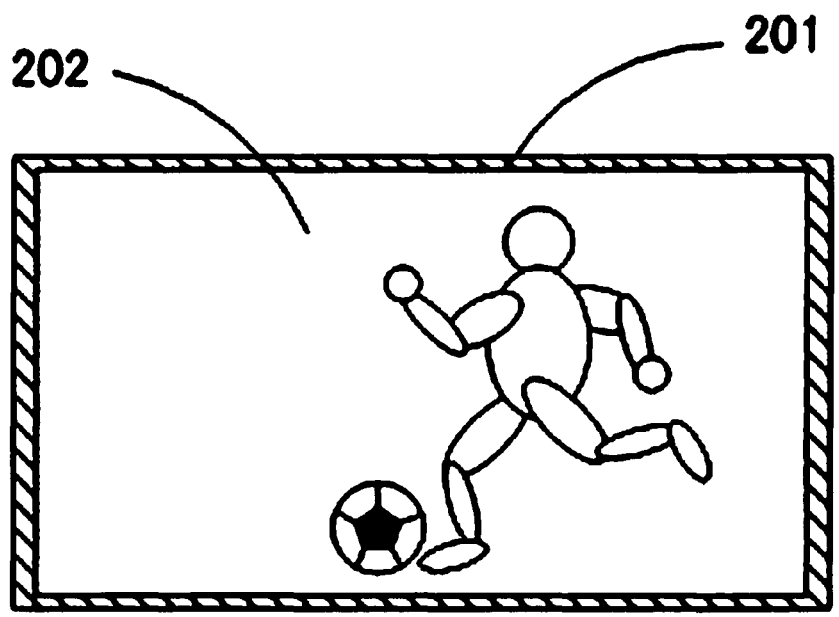
Figure 17A:
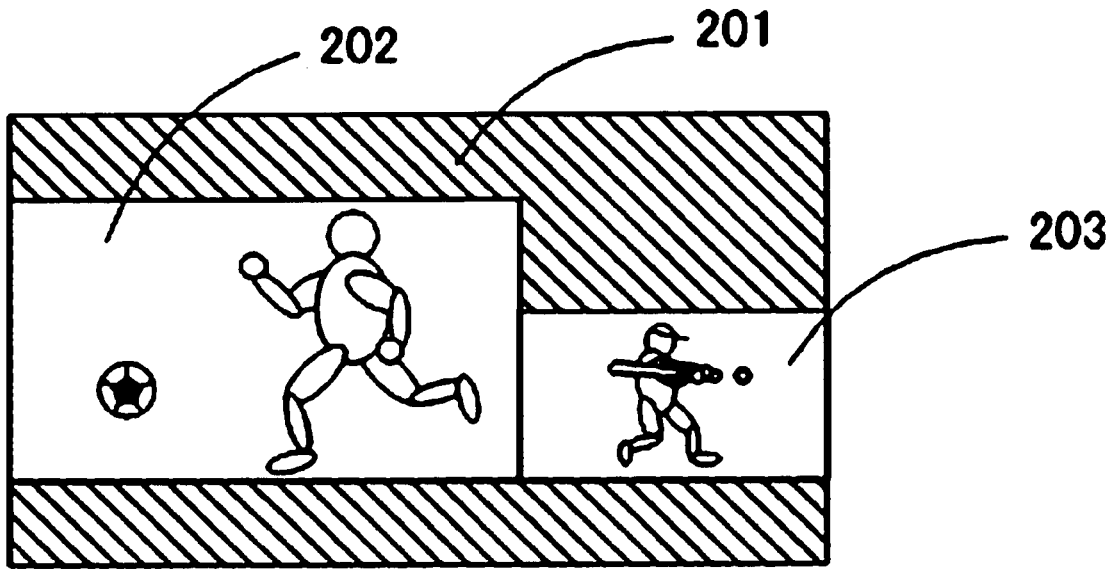
FIGS. 17A and 17B are modified examples of a change of display screen in a conventional technique.
Figure 17B:
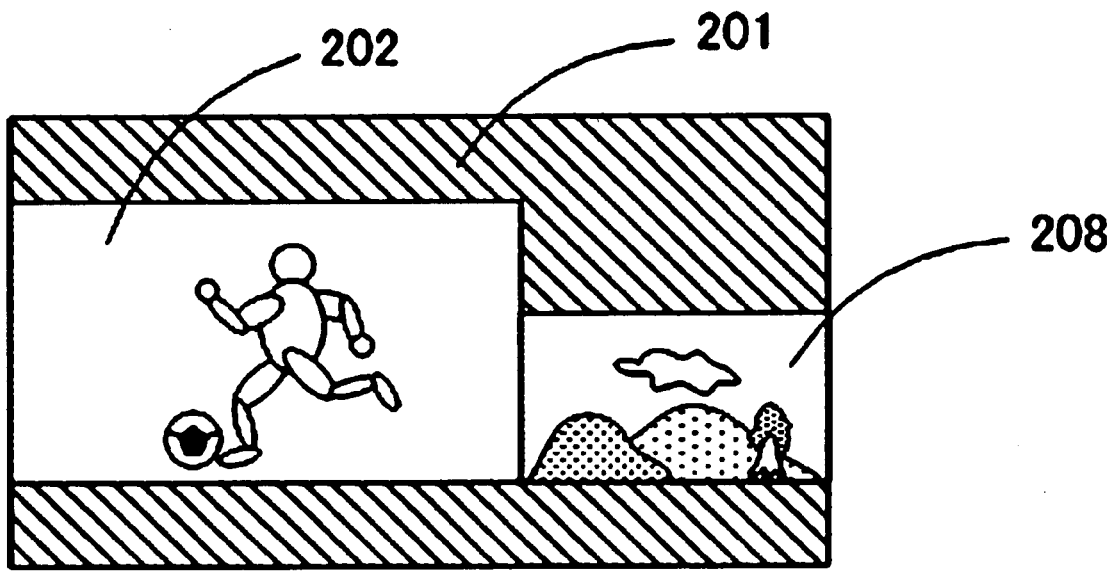

The process according to the fourth embodiment will now be described with reference to the flowchart. FIG. 14 shows the process from when the power source is turned on to when display area information is set. The process following synthesis of images based on display area information is identical to that in FIG. 9. Additionally, in FIG. 14, the process up to step S3 in which the tuner units 1 to 4 extract image and sound signals and program information is identical to that in FIG. 4.

The program information acquisition unit 8 acquires genre information for a program from the extracted program information (step S19). For each of display areas, the comparison unit 9 compares genre information for display area information stored in the memory unit 7 with the acquired genre information (step S20). If the genre information does not match, the retrieve unit 12 acquires genre information from program information for another channel (step S21). Information for another channel may be acquired by another tuner if it is available, or by using program information such as Electronic Program Guide (EPG) if it is accumulated.

Further, the retrieve unit 12 searches for a program whose genre matches the genre information of the stored display area information (step S22). If the program is found, the retrieve unit 12 acquires the channel number on which the program is broadcast, and then changes a channel corresponding to the target display area to this channel (step S23). Simultaneously, the control unit 10 rewrites the channel number and genre information for the display area information (step S24), and the process proceeds to that of FIG. 9.

As a result of the search in step S22, if there is no program whose genre matches that for the stored display area information, the control unit 10 changes the display area information so that the single main window is displayed on the display screen (step S25), and the process proceeds to that of FIG. 9.

Here, information changes in the memory unit 7 in steps S22 to S24 will now be described with reference to FIGS. 15A and 15B.

FIG. 15A shows display area information stored in the memory unit 7 immediately before the power source is turned off. A channel 2 is being watched in a display area with the identification number 1, and the genre of the program on this channel is soccer, sport. In addition, a channel 5 is being watched in a display area with the identification number 2, and the genre of the program is baseball, sport.

FIG. 15B shows listed information stored in the memory unit 7 after the display area information is rewritten in step S24. FIG. 15B shows an example where the genre of the program when the power source is turned off is found on another channel; and the channel number corresponding to the identification number 1 has been changed to 8, but the genre has not been changed.

Thus, according to the fourth embodiment, even where the program when the power source is turned off is over, a program with the same genre can be watched on another channel if the latter is being broadcast.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-200588, filed on Aug. 4, 2008, which is hereby incorporated by reference herein its entirety.

What is claimed is:

1. An image processing apparatus having a multi-window display mode for displaying a plurality of images on a display screen of a display unit and a single-window display mode for displaying one image on the display screen of the display unit comprising:
    a receiving unit which receives image signals relating to a plurality of programs;
    an acquisition unit which acquires program information relating to the plurality of programs;
    a memory unit which stores the program information relating to at least one selected program; and
    a control unit which compares the program information stored in the memory unit with program information newly acquired by the acquisition unit, and switches the display mode from the multi-window display mode to the single-window display mode according to the result of comparing.

2. An image processing apparatus according to claim 1, wherein the control unit exerts control such that if there is a program corresponding to newly acquired program information matched with the stored program information based on the result of comparing, an image of the program is displayed.

3. An image processing apparatus according to claim 1, wherein
    the control unit exerts control so as to switch the display mode from the multi-window display mode to the single-window display mode if there is at least one program corresponding to newly acquired program information different from the stored program information.

4. An image processing apparatus according to claim 1, wherein
    the multi-window screen includes one main window and at least one sub-window; and
    the control unit exerts control based on the result of comparing such that if the newly acquired program information corresponding to the main window and the sub-window are different from the stored program information, an image corresponding to the main window is displayed in the single-window display mode.

5. An image processing apparatus according to claim 1, wherein the multi-window screen includes one main window and at least one sub-window; and
    the control unit exerts control based on the result of comparing such that if newly acquired program information corresponding to the main window matches with the stored program information and, in addition, newly acquired program information corresponding to the sub-window matches with the stored program information, the multi-window display mode is maintained, and if not, the display mode is switched to a single-window display mode.

6. An image processing apparatus according to claim 5, wherein
    the control unit exerts control based on the results of comparing such that if newly acquired program information corresponding to the main window matches with the stored program information and, in addition, newly acquired program information corresponding to the sub-window is different from the stored program information, an image corresponding to the main window is displayed in a single-window display mode, and if newly acquired program information corresponding to the main window is different from the stored program information and, in addition, newly acquired program information corresponding to the sub-window matches with the stored program information, an image corresponding to the sub-window is displayed in the single-window display mode.

7. An image processing apparatus according to claim 1, wherein
the receiving unit receives broadcast image signals relating to the plurality of programs, and wherein
a plurality of broadcast images are displayed on the display screen of the display unit in the multi-window display mode, and a broadcast image is displayed on the display screen of the display unit in the single-window display mode.

8. An image processing apparatus according to claim 1, wherein
the program information is a title or genre of the program.

9. An image processing apparatus according to claim 1, wherein
the control unit compares the program information stored in the memory unit with program information newly acquired by the acquisition unit when the power source of the apparatus is turned on.

10. A method for controlling an image processing apparatus having a multi-window display mode for displaying a plurality of images on a display screen of a display unit and a single-window display mode for displaying one image on the display screen of the display unit comprising:
a receiving step of receiving image signals relating to a plurality of programs;
a acquisition step of acquiring program information relating to the plurality of programs;
a memory step of storing program information relating to at least one selected program; and
a control step of comparing at a predetermined timing the program information stored in the memory step with program information newly acquired by the acquisition step at the predetermined timing, and switching the display mode from the multi-window display mode to the single-window display mode according to the result of comparing.

11. A method for controlling the image processing apparatus according to claim 10, wherein
the control step exerts control such that if there is a program corresponding to newly acquired program information matched with the stored program information based on the result of comparing, an image of the program is displayed.

12. A method for controlling the image processing apparatus according to claim 10, wherein
the control step exerts control so as to switch the display mode from the multi-window display mode to the single-window display mode if there is at least one program corresponding to newly acquired program information different from the stored program information.

13. A method for controlling the image processing apparatus according to claim 10, wherein
the multi-window screen includes one main window and at least one sub-window; and
the control step exerts control based on the result of comparing such that if the newly acquired program information corresponding to the main window and the sub-window are different from the stored program information, an image corresponding to the main window is displayed in the single-window display mode.

14. A method for controlling the image processing apparatus according to claim 10, wherein
the multi-window screen includes one main window and at least one sub-window; and
the control step exerts control based on the result of comparing such that if newly acquired program information corresponding to the main window matches with the stored program information and, in addition, newly acquired program information corresponding to the sub-window matches with the stored program information, the multi-window display mode is maintained, and if not, the display mode is switched to a single-window display mode.

15. A method for controlling the image processing apparatus according to claim 14, wherein
the control step exerts control based on the result of comparing such that if newly acquired program information corresponding to the main window matches with the stored program information and, in addition, newly acquired program information corresponding to the sub-window is different from the stored program information, an image corresponding to the main window is displayed in a single-window display mode, and if newly acquired program information corresponding to the main window is different from the stored program information and, in addition, newly acquired program information corresponding to the sub-window matches with the stored program information, an image corresponding to the sub-window is displayed in the single-window display mode.

16. A method for controlling the image processing apparatus according to claim 10, wherein
the receiving step receives broadcast image signals relating to the plurality of programs, and wherein
a plurality of broadcast images are displayed on the display screen of the display unit in the multi-window display mode, and a broadcast image is displayed on the display screen of the display unit in the single-window display mode.

17. A method for controlling the image processing apparatus according to claim 10, wherein
the program information is a title or genre of the program.

18. A method for controlling the image processing apparatus according to claim 10, wherein
the control step compares the program information stored in the memory step with program information newly acquired by the acquisition step when the power source of the apparatus is turned on.

* * * * *